(12) United States Patent
Chen et al.

(10) Patent No.: US 7,860,845 B2
(45) Date of Patent: *Dec. 28, 2010

(54) METHOD, SYSTEM AND COMPUTER PROGRAM FOR INSERTING RECORDS INTO A DATABASE

(75) Inventors: Zhimin Chen, Markham (CA); Linqi Liu, Toronto (CA); Xiaoyan Qian, Aurora (CA); Serge Philippe Rielau, Greenwood (CA)

(73) Assignee: International Business Machines Corporation, Armonk, NY (US)

( * ) Notice: Subject to any disclaimer, the term of this patent is extended or adjusted under 35 U.S.C. 154(b) by 701 days.

This patent is subject to a terminal disclaimer.

(21) Appl. No.: 11/781,841

(22) Filed: Jul. 23, 2007

(65) Prior Publication Data
US 2007/0288492 A1 Dec. 13, 2007

Related U.S. Application Data

(62) Division of application No. 10/923,548, filed on Aug. 20, 2004, now Pat. No. 7,349,910.

(51) Int. Cl.
*G06F 7/00* (2006.01)
(52) U.S. Cl. .............. 707/702; 707/609; 707/687; 707/690; 707/691
(58) Field of Classification Search ............ 707/609, 707/999.001, 999.002, 999.005, 999.1, 687, 707/690, 691, 702
See application file for complete search history.

(56) References Cited
U.S. PATENT DOCUMENTS
5,546,576 A * 8/1996 Cochrane et al. ............. 1/1

5,680,614 A 10/1997 Bakuya et al.
5,873,075 A 2/1999 Cochrane et al.
6,078,925 A 6/2000 Anderson et al.

(Continued)

OTHER PUBLICATIONS

Rielau, *Updateable Union All views in DB2 Universal Database Version 8*, DB2 SQL Query Compiler Development, IBM Toronto Lab Sep. 2002, © 2002 IBM, Corporation, http://227b.software.ibm.com/dmdd/library/techarticle/0209rielau/0209rielau.html).

IBM Marketing Announcement, Jul. 23, 2002. Preview: IBM DB2 Universal Database, V9.1, Delivery Enhanced Scalability, Manageability, and Availability for e-business Deployment—Beta is Available http://www.ibmlink.ibm.com/PS/EMEA/ZA020235.PS).

(Continued)

*Primary Examiner*—Etienne P LeRoux
*Assistant Examiner*—Bruce A Witzenburg
(74) *Attorney, Agent, or Firm*—Sughrue Mion, PLLC (57) ABSTRACT

For a data processing system having memory for storing a database, a method, a system and a computer program product for directing the data processing system to process a record to be inserted into the database is disclosed. The database includes a plurality of base tables. The method includes the steps of making a record copy matching the record, for each base table to be selected from the plurality of base tables: providing a base table candidate indication for a selected base table, the base table candidate indication indicating whether the selected base table is a candidate base table that may receive the record, the base table candidate indication being determined on an outcome of executing before triggers and an outcome of testing constraints in association with the record copy, the before triggers and the constraints being associated with the selected base table; and restoring the record copy so that the record copy matches the record before providing a next subsequent base table candidate indication for another base table to be selected.

12 Claims, 5 Drawing Sheets

U.S. PATENT DOCUMENTS

| | | |
|---|---|---|
| 6,421,658 B1 | 7/2002 | Carey et al. |
| 6,460,052 B1 | 10/2002 | Thomas et al. |
| 6,745,174 B2 * | 6/2004 | Levy et al. .......................... 1/1 |
| 6,882,993 B1 | 4/2005 | Lawande et al. |
| 6,957,225 B1 | 10/2005 | Zait et al. |
| 7,028,057 B1 | 4/2006 | Vasudevan et al. |
| 7,162,505 B2 * | 1/2007 | Rielau et al. ...................... 1/1 |
| 7,181,461 B2 | 2/2007 | Bonner et al. |
| 7,209,933 B2 * | 4/2007 | Saxena ............................ 1/1 |
| 7,257,597 B1 | 8/2007 | Pryce et al. |
| 2003/0078923 A1 | 4/2003 | Voss et al. |
| 2005/0131964 A1 | 6/2005 | Saxena |
| 2005/0131966 A1 | 6/2005 | Lou |

OTHER PUBLICATIONS

Notice of Allowance mailed Jul. 15, 2010 in U.S. Appl. No. 12/021,462.

* cited by examiner

| product_no | sales | date | date_cp1 | date_cp2 | tbl_id |
|---|---|---|---|---|---|

Fig. 1

| 7 | 20 | 2000-05-10 | 2000-05-10 | - | - |
|---|---|---|---|---|---|
| 6 | 14 | 2000-10-3 | 2000-10-3 | - | - |
| 10 | 27 | 2000-06-30 | 2000-06-30 | - | - |
| 9 | 18 | 2000-02-03 | 2000-02-03 | - | - |

Fig. 2

| 7 | 20 | 2000-01-01 | 2000-05-10 | - | - |
|---|---|---|---|---|---|
| 6 | 14 | 2000-10-3 | 2000-10-3 | - | - |
| 10 | 27 | 2000-06-30 | 2000-06-30 | - | - |
| 9 | 18 | 2000-02-03 | 2000-02-03 | - | - |

Fig. 3

| 7 | 20 | 2000-05-01 | 2000-05-10 | 2000-01-01 | Y00Q1 |
| 6 | 14 | 2000-10-3 | 2000-10-3 | - | - |
| 10 | 27 | 2000-06-30 | 2000-06-30 | - | - |
| 9 | 18 | 2000-02-03 | 2000-02-03 | - | - |

Fig. 4

| 7 | 20 | 2000-05-01 | 2000-05-10 | 2000-01-01 | Y00Q1 |
| 6 | 14 | 2000-10-3 | 2000-10-3 | - | - |
| 10 | 27 | 2000-06-30 | 2000-06-30 | - | - |
| 9 | 18 | 2000-04-01 | 2000-02-03 | - | - |

Fig. 5

| 7 | 20 | 2000-05-01 | 2000-05-10 | 2000-01-01 | Y00Q1 |
| 6 | 14 | 2000-10-3 | 2000-10-3 | - | - |
| 10 | 27 | 2000-06-30 | 2000-06-30 | 2000-06-30 | Y00Q2 |
| 9 | 18 | 2000-02-03 | 2000-02-03 | 2000-04-01 | Y00Q2 |

Fig. 6

| 7 | 20 | 2000-05-01 | 2000-05-10 | 2000-01-01 | Y00Q1 |
| 6 | 14 | 2000-10-3 | 2000-10-3 | - | - |
| 10 | 27 | 2000-06-30 | 2000-06-30 | 2000-06-30 | error |
| 9 | 18 | 2000-02-03 | 2000-02-03 | 2000-04-01 | Y00Q2 |

Fig. 7

| 7 | 20 | 2000-05-01 | 2000-05-10 | 2000-01-01 | Y00Q1 |
| 6 | 14 | 2000-10-3 | 2000-10-3 | 2000-10-3 | Y00Q4 |
| 10 | 27 | 2000-06-30 | 2000-06-30 | 2000-06-30 | error |
| 9 | 18 | 2000-02-03 | 2000-02-03 | 2000-04-01 | Y00Q2 |

METHOD, SYSTEM AND COMPUTER PROGRAM FOR INSERTING RECORDS INTO A DATABASE

This is a divisional of application Ser. No. 10/923,548 filed Aug. 20, 2004 filed in the United States patent and Trademark Office. The entire disclosure of the prior application, application No. 10/923,548 is hereby incorporated by reference.

FIELD OF THE INVENTION

The present invention relates to database management systems. More specifically, the present invention relates to database management systems which operate to process records for the purpose of inserting the records into a database.

BACKGROUND

Database Management Systems (DBMS) allow the collection, organization, searching and processing of information in a variety of manners. Typically, data in such DBMS are stored in tables comprising columns, which define fields of information for a record, and rows, containing specific records of those fields of the database. Many modern DBMS employ Structured Query Language (SQL) as at least one of the mechanisms by which the DBMS can be controlled, including defining tables and views.

A view is a result set of records in the database which results from a query. Typically, a DBMS can perform SQL commands, such as SELECT, UPDATE, INSERT or DELETE against a view without being aware of the definition of the view and/or its underlying tables.

One example of a DBMS is the IBM® DB2® Universal Database manufactured and sold by IBM and the SQL examples used herein employ DB2 SQL statements. As one of its advanced features, this DBMS permits a UNION ALL view to be created wherein two or more physically separate tables are logically merged into one view for certain types of processing. Amongst other advantages, this allows large databases which, if stored as a single table would exceed various DBMS and/or hardware limits, to instead be physically partitioned into a variety of smaller tables. For example, if several years global sales data for a corporation is stored in a single table, that table could easily exceed the maximum table size that a DBMS will allow. With a UNION ALL view, the corporation can create sales data tables for the sales in each month, or for the sales in each quarter, etc. which will result in smaller tables. Yet, the corporation can process the data stored in these various tables as if they were stored in one large table by employing a UNION ALL view.

While the UNION ALL view provides significant advantages, it is however subject to some limitations. Specifically, performing INSERT operations against a UNION ALL view can raise issues as it may not be clear which base table of the UNION ALL view the INSERT operation should operate on as the constraints of the base tables and/or any before triggers applicable to them are not known by the UNION ALL view.

Published U.S. patent application 2003/0204540 to Rielau et al. teaches one method of performing an INSERT against a UNION ALL view. While the method taught in Rielau et al. provides advantages over other known methods for performing INSERTs against UNION ALL views, it can be computationally expensive to perform.

SUMMARY

It is an object of the present invention to provide a novel product and method for inserting entries into a database via a union all view, or the like, which obviates or mitigates at least one disadvantage of the prior art.

According to a first aspect of the present invention, there is provided, for a database management system to be operatively coupled to a data processing system having memory for storing a database, a method of processing a record to be inserted into the database, the database comprising a plurality of base tables, the method including the steps of making a record copy matching the record, for each base table to be selected from the plurality of base tables: providing a base table candidate indication for a selected base table, the base table candidate indication indicating whether the selected base table is a candidate base table that may receive the record, the base table candidate indication being determined on an outcome of executing before triggers and an outcome of testing constraints in association with the record copy, the before triggers and the constraints being associated with the selected base table, and restoring the record copy so that the record copy matches the record before providing a next subsequent base table candidate indication for another base table to be selected.

According to another aspect of the present invention, there is provided, for a database management system to be operatively coupled to a data processing system having memory for storing a database, a computer program product for directing the data processing system to process a record to be inserted into the database, the database comprising a plurality of base tables, the computer program product including a computer readable medium tangibly embodying computer executable code for directing the data processing system, the computer executable code including code for making a record copy matching the record, code to be executed for each base table to be selected from the plurality of base tables, the code to be executed including code for providing a base table candidate indication for a selected base table, the base table candidate indication indicating whether the selected base table is a candidate base table that may receive the record, the base table candidate indication being determined on an outcome of executing before triggers and an outcome of testing constraints in association with the record copy, the before triggers and the constraints being associated with the selected base table, and code for restoring the record copy so that the record copy matches the record before providing a next subsequent base table candidate indication for another base table to be selected.

According to yet another aspect of the present invention, there is provided, for a database management system to be operatively coupled to a data processing system having memory for storing a database, a method for inserting received data into the database through a view constructed from a union of two or more base tables, each base table having one or more constraints defining necessary conditions for at least one field of the data to meet for data to be inserted into the respective base table and including at least one before trigger operable to modify the data in a field before the insertion is performed, the method comprising the steps of for each field of the received data, adding a first column to the received data to each hold a copy of the original value of the field and copying the original values to the first column, adding a table identifier column to the received data to hold an identifier of a base table and setting the value of each row of the table identifier column to a predefined value, for each base table in turn, executing all before triggers defined for the base table on the received data and determining for each row of the received data if the values of the received data after the before triggers have been processed meet the identified constraints to insert the row of received data into the base table and, for each row:

(a) if the identified constraints are met, determining if the table identifier column for that row has the predefined value and: (i) if it does not, marking the row with an error message indicating an ambiguous insert error and, (ii) if it does have the predefined value, then changing the value of the table identifier column to indicate the base table under consideration and copying the original value of each field from the first column to the respective field; or (b) if the identified constraints are not met, copying the original value of each field from the first column to the respective identified field; and after all base tables have been considered, inserting each row of received data with an indication of a base table in the table identifier column into the indicated base table having first processed all before triggers defined for the indicated base table.

According to yet another aspect of the present invention, there is provided for a database management system to be operatively coupled to a data processing system having memory for storing a database, a computer program product for directing the data processing system to process a record to be inserted into the database, the database comprising a plurality of base tables, the computer program product including a computer readable medium tangibly embodying computer executable code for directing the data processing system, the computer executable code including code for making a record copy matching the record, code to be executed for each base table to be selected from the plurality of base tables, the code to be executed including code for providing a base table candidate indication for a selected base table, the base table candidate indication indicating whether the selected base table is a candidate base table that may receive the record, the base table candidate indication being determined on an outcome of executing before triggers and an outcome of testing constraints in association with the record copy, the before triggers and the constraints being associated with the selected base table, and code for restoring the record copy so that the record copy matches the record before providing a next subsequent base table candidate indication for another base table to be selected.

for a database management system to be operatively coupled to a data processing system having memory for storing a database, a computer program product fir directing the data processing system to insert received data into the database through a view constructed from a union of two or more base tables, each base table having one or more constraints defining necessary conditions for at least one field of the data to meet for data to be inserted into the respective base table and including at least one before trigger operable to modify the data in a field before the insertion is performed, the computer program product including a computer readable medium for tangibly transporting computer executable code for directing the data processing system, the computer executable code including code for adding a first column to the received data to each hold a copy of the original value of the field and copying the original values to the first column for each field of the received data, code for adding a table identifier column to the received data to hold an identifier of a base table and setting the value of each row of the table identifier column to a predefined value, code for executing, for each base table in turn, all before triggers defined for the base table on the received data and determining for each row of the received data if the values of the received data after the before triggers have been processed meet the identified constraints to insert the row of received data into the base table and, for each row: (a) if the identified constraints are met, determining if the table identifier column for that row has the predefined value and: (i) if it does not, marking the row with an error message indicating an ambiguous insert error and, (ii) if it does have the predefined value, then changing the value of the table identifier column to indicate the base table tinder consideration and copying the original value of each field from the first column to the respective field; or (b) if the identified constraints are not met, copying the original value of each field from the first column to the respective identified field, and code for inserting each row of received data, after all base tables have been considered, with an indication of a base table in the table identifier column into the indicated base table having first processed all before triggers defined for the indicated base table.

BRIEF DESCRIPTION OF THE DRAWINGS

Preferred embodiments of the present invention will now be described, by way of example only, with reference to the attached Figures, wherein.

DETAILED DESCRIPTION OF THE EMBODIMENTS

The following discussion refers to a DBMS which employs SQL as at least one of the mechanisms by which the DBMS can be controlled and operated. However, as will be apparent to those of skill in the art, the present invention is not limited to use with DBMS that employ SQL and can in fact be used advantageously with any DBMS that offers logical views constructed from union operations on multiple tables.

In the following discussion, an example of a database including sales data for a corporation is employed. The fields of the sales data comprises a date, a product ID number, and an amount and the creator of the database has decided to physically partition the sales data tables into fiscal quarters. A table for the $1^{st}$ fiscal quarter of 2000 can be created with the SQL statement:

CREATE TABLE Y00Q1(product_no INT, sales INT, date DATE).

Tables for the remaining three fiscal quarters of 2000 can be created with the following SQL statements:

CREATE TABLE Y00Q2 LIKE Y00Q1;

CREATE TABLE Y00Q3 LIKE Y00Q1;

and

CREATE TABLE Y00Q4 LIKE Y00Q1;

to obtain the necessary tables for the fiscal quarters of year 2000 shown. In this example, only the four tables for a single year have been created, although as will be apparent to those of skill in the art additional table for other fiscal quarters can also be created as desired.

After the four tables are created, a constraint is defined for each table to ensure that data entered into the tables meets their intended purpose. Specifically, the dates that can be accepted by each table are constrained to be within the relevant range for each table with the following SQL statements:

```
ALTER TABLE Y00Q1 ADD CONSTRAINT
    Y00Q1_CHK_DATE CHECK (MONTH(date)
    IN (1, 2, 3) AND YEAR(date)=2000);

ALTER TABLE Y00Q2 ADD CONSTRAINT
    Y00Q2_CHK_DATE CHECK (MONTH(date)
    IN (4, 5, 6) AND YEAR(date)=2000);

ALTER TABLE Y00Q3 ADD CONSTRAINT
    Y00Q3_CHK_DATE CHECK (MONTH(date)
    IN (6, 7, 8, 9) AND YEAR(date)=2000);

ALTER TABLE Y00Q4 ADD CONSTRAINT
    Y00Q4_CHK_DATE CHECK (MONTH(date)
    IN (10, 11, 12) AND YEAR(date)=2000)
```

Thus, table Y00Q1 will accept dates in January, February or March of 2000, Y00Q2 will accept dates in April, May or June of 2000, Y00Q3 will accept dates in June, July, August, September of 2000 and Y00Q4 will accept dates in October, November and December of 2000 and the attempted entry of dates into a table outside the constrained range applicable for that table will result in an error. The overlap in the date constraints for tables Y00Q2 and Y00Q3, allowing dates in June 2000 to be input into both tables, has been specified herein solely for illustrative purposes in the following discussion.

As is known, a view representing the entire Fiscal year 2000 can be created with:

```
CREATE VIEW FY2000 AS

SELECT product_no, sales, date FROM Y00Q1

UNION ALL

SELECT product_no, sales, date FROM Y00Q2

UNION ALL

SELECT product_no, sales, date FROM Y00Q3

UNION ALL

SELECT product_no, sales, date FROM Y00Q4;

SELECT*FROM FY
```

In advanced DBMS systems, such as the above-mentioned DB2 system, INSERTs can be performed on UNION ALL views. However, such INSERTs are not necessarily easy for the DBMS to perform.

One difficulty is that, when attempting INSERT through UNION ALL views, a before trigger can modify data that one or more fields of data and that such before triggers are defined on a per table basis. For example, it may be desired to include any sales of product number 9 which occurred in the first fiscal quarter into the results for the second fiscal quarter instead of in the first fiscal quarter. Thus, in this example, it is possible to define a constraint for table Y00Q1 to prevent entry of data for product "9", as follows:

```
ALTER TABLE Y00Q1 ADD CONSTRAINT
    Y00Q1_CHK_PRODUCT CHECK (product_
    no<>9);
``` and to define a before trigger for table Y00Q2 which, for product "9" changes the date to the first day of the second fiscal quarter, as follows:

```
CREATE TRIGGER I_Y00Q2_PN9 NO CASCADE
    BEFORE INSERT ON Y00Q2 REFERENCING
    NEW AS n FOR EACH ROW MODE DB2SQL
    SET n.date=CASE WHEN (n.product_no=9
    AND MONTH(n.date) IN (1, 2, 3) THEN 2000-
    04-01 ELSE n.date END
```

Similarly, it may be desired to include any sales of product number 7 which occurred in the second fiscal quarter into the results for the first fiscal quarter. Thus, in this example, it is possible to define a constraint for table Y00Q2 to prevent entry of data for product "7", as follows:

```
ALTER TABLE Y00Q2 ADD CONSTRAINT
    Y00Q2_CHK_PRODUCT CHECK (product_
    no<>7);
``` and to define a before trigger for table Y00Q1 which, for product "7" changes the date to the first day of the first fiscal quarter, as follows:

```
CREATE TRIGGER I_Y00Q1_PN7 NO CASCADE
    BEFORE INSERT ON Y00Q1 REFERENCING
    NEW AS n FOR EACH ROW MODE DB2SQL
    SET n.date=CASE WHEN (n.product_no=7
    AND MONTH(n.date) IN (4, 5, 6) THEN 2000-
    01-01 ELSE n.date END
```

When an INSERT is performed against a UNION ALL VIEW there are three possible outcomes, namely: the INSERT can fail against all of the base tables as a no target error (for example, trying to input sales data for fiscal year 2001 into a UNION ALL VIEW of the example tables described above would fail as such dates do not meet the constraints of any of the base tables of the UNION ALL VIEW); the INSERT can fail as being for being an ambiguous insert as it can be inserted into more than one base table of the UNION ALL VIEW (for example, sales data for June 2000 can be inserted into both of the Y00Q2 and Y00Q3 tables); or the INSERT can succeed by inserting the data into one and only one of the base tables for the UNION ALL VIEW.

If it is desired to add new data to the database through the UNION ALL view, it is necessary for the DBMS to ensure that one, and only one, of the above-mentioned three permitted outcomes of the INSERT operation is achieved.

In an embodiment of the present invention, this is achieved in a relatively computationally efficient manner by first determining each field in any base table of the UNION ALL view which is modified by a before trigger. Such fields are referred to herein as "identified fields". In the example above, only the identified field is the date field which can be modified by the before triggers defined for tables Y00Q1 and Y00Q2.

Figure 1:
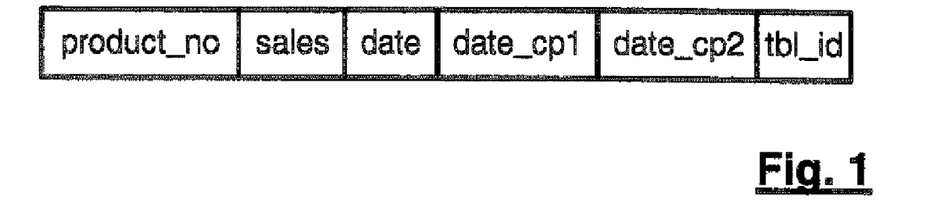
FIG. 1 shows a row schema from a working table of received data in accordance with the present invention.

Once all of the identified fields are determined, then a working table of the received data is constructed which comprises each of the fields of the base tables plus two additional copies of each identified field (in this example the only identified field is the date field, so the two copies are date_cp1 and date_cp2) and a table ID field (tb1_id) which is also added, as shown in the row schema of FIG. 1. Data to be INSERTED through the UNION ALL view is loaded into this working table, with the value of the identified fields being copied into the first additional copy field (in this example, the value of date is copied into date_cp1 for each row of received data) and the second additional copy and the table ID fields (in this example date_cp2 and tb1_id) are each set to NULL.

Figure 2:
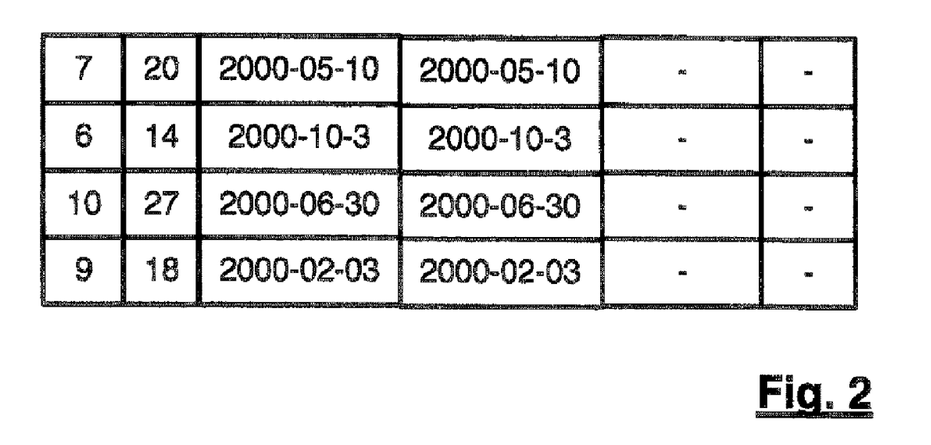
FIG. 2 shows an example of received data in the working table of FIG. 1.

As will be apparent to those of skill in the art, received data to be inserted into a database through a UNION ALL view can be received in a variety of manners, including SELECT operations, data input, etc. In this example, if the data to be INSERTed through the UNION ALL view is:

7, 20, 2000-05-10;
6, 14, 2000-10-03;
10, 27, 2000-06-30;
9, 18, 2000-02-03 then the working table will be:

(7, 20, '2000-05-10', '2000-05-10',-,-)
(6, 14, '2000-10-03', '2000-10-03',-,-)
(10, 27, '2000-06-30', '2000-06-30',-,-)
(9, 18, '2000-02-03', '2000-02-03',-,-)

as shown in FIG. 2.

Figure 3:
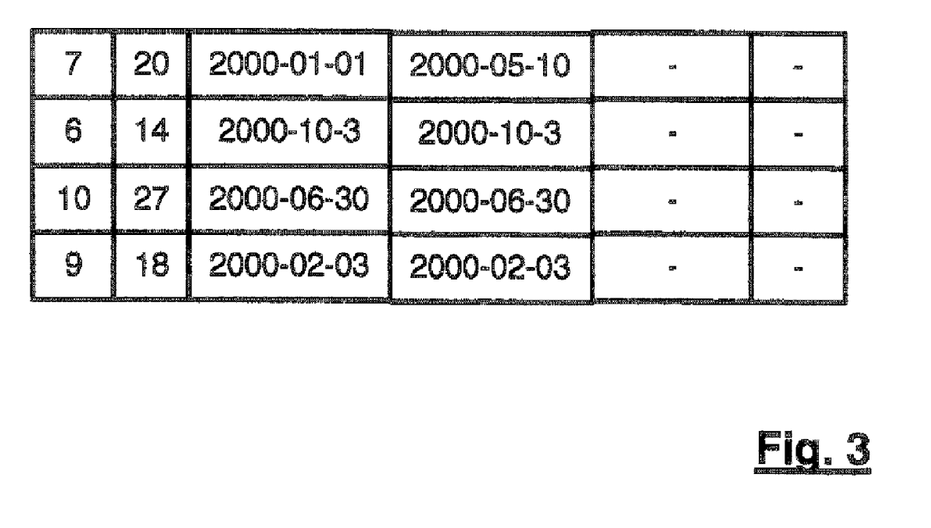
FIG. 3 shows the working table of FIG. 1 after a before trigger defined for a base table is executed.

Next, for each base table in the UNION ALL VIEW in turn, each row of the working table is processed. First, all before triggers for the base table are fired (i.e.—processed). In our example, for table F00Q1, trigger I_Y00Q1_PN7 is processed and this modifies the data of the working table as shown in FIG. 3 Specifically, the first row of the working table had a product number equal to "7" and a date in Q2, so the value of the date field has been set to Jan. 1, 2000. None of the other rows of the working table are affected by the before trigger defined for table Y00Q1.

Next the constraints for the base table under consideration are evaluated. For any row which meets all of the constraints for the base table, the value of the table ID field is checked. If the value of the table ID field for that row is NULL, then: an identifier for the base table under consideration is inserted into the table ID field; the before trigger processed value of each identified field is copied to the each respective second copy field, in our example date_cp2; and the original value from each identified field is copied from each respective first copy field, in our example date_cp1, back to each respective identified field.

If the value of the table ID field for that row is not NULL, then the method returns an error message indicating that that row has suffered an ambiguous insertion error. In a present embodiment of the invention, the error message is returned by storing a pre-selected error code in the table ID field.

Figure 4:
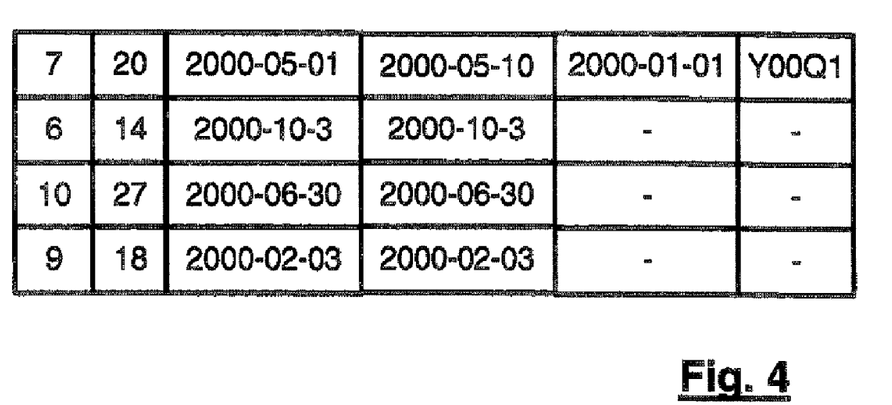
FIG. 4 shows the working table of FIG. 3 after processing of the base table is complete.

For the working table shown in FIG. 3, row one meets the constraints for insertion into table Y00Q1 and FIG. 4 shows the working table after processing of table Y00Q1 has completed.

Figure 5:
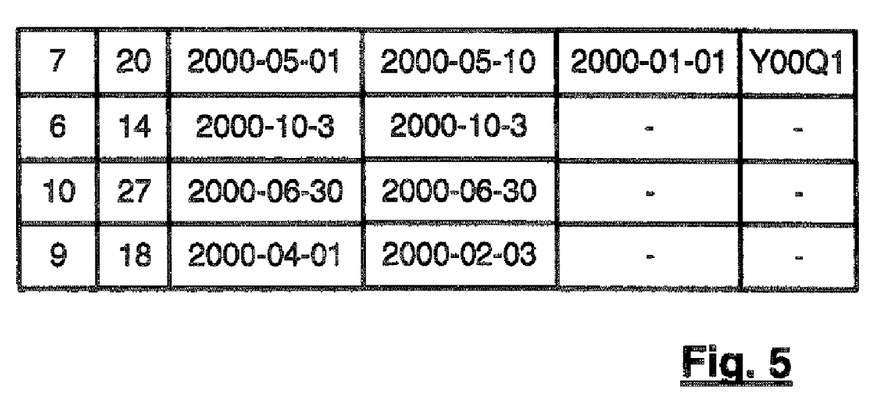
FIG. 5 shows the working table of FIG. 4 after a before trigger defined for another base table is executed.

The next base table is now processed in the same manner. Assuming table Y00Q2 is next processed, the before triggers for this table, specifically before trigger I_Y00Q2_PN9, are fired and this modifies the data of the working table as shown in FIG. 5. Specifically, the fourth row of the working table had a product number equal to 9 and a date in Q1 so the value of the date field has been set to Apr. 1, 2000.

Next the constraints for the F00Q2 are evaluated. Again, for any row which meets all of the constraints of the base table, the table ID field for that row is checked. If the value of the table ID field for that row is NULL, then: an identifier for the base table under consideration is inserted into the table ID field; the before trigger processed value of each identified field is copied to the respective second copy field, in our example date_cp2; and the original value from each identified field is copied from the respective first copy field, in our example date_cp1, back to the respective identified field.

If the value of the table ID field for that row is not NULL, then the method returns an error message indicating that that row has suffered an ambiguous insertion error.

Figure 6:
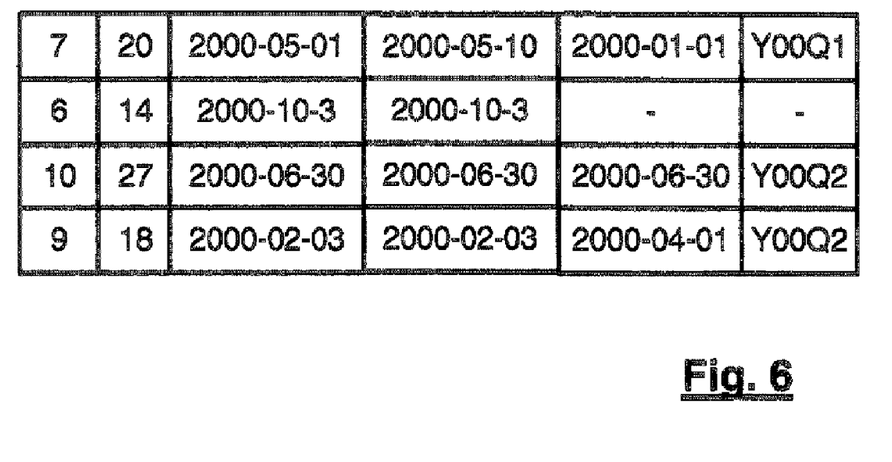
FIG. 6 shows the working table of FIG. 5 after processing of the other base table is complete.

For the working table shown in FIG. 5, rows three and four meet the constraints for insertion into table Y00Q2 and FIG. 6 shows the working table after processing of table Y00Q2 has completed.

Figure 7:
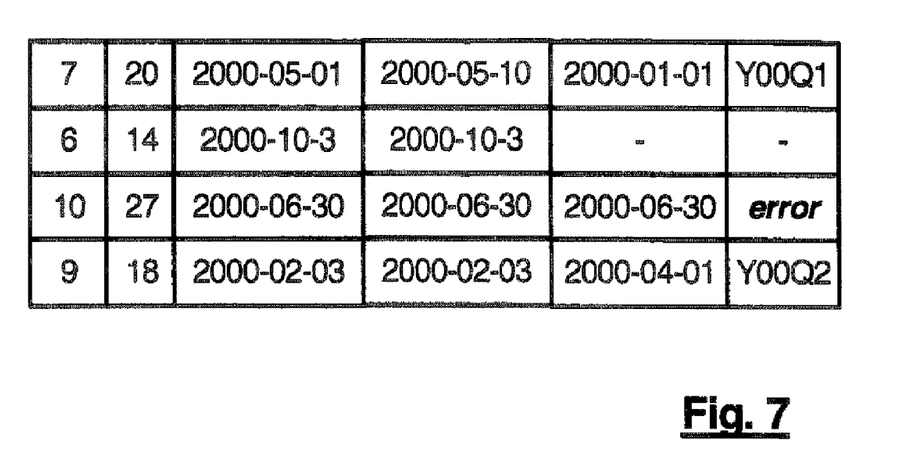
FIG. 7 shows the working table of FIG. 6 after processing of another base table an wherein an ambiguous insertion error has been detected.

The next base table, in this example Y00Q3, is then processed in the same manner. In this case, no before triggers are defined for table Y00Q3 so the working table is unchanged from that shown in FIG. 6 when the next step, evaluating the constraints for table Y00Q3 is performed. As will now be apparent, the third row is the only row of the working table that meets the constraints for Y00Q3 so the table ID field for that row is now checked. As indicated, the table ID field for that row is not NULL, as that row also fulfilled the criteria for table Y00Q2 and had an identifier for Y00Q2 inserted into table ID, and the method sets the table ID field to an error code, as shown in FIG. 7, indicating that an ambiguous insert result has been obtained and no further consideration of that row need occur.

Figure 8:
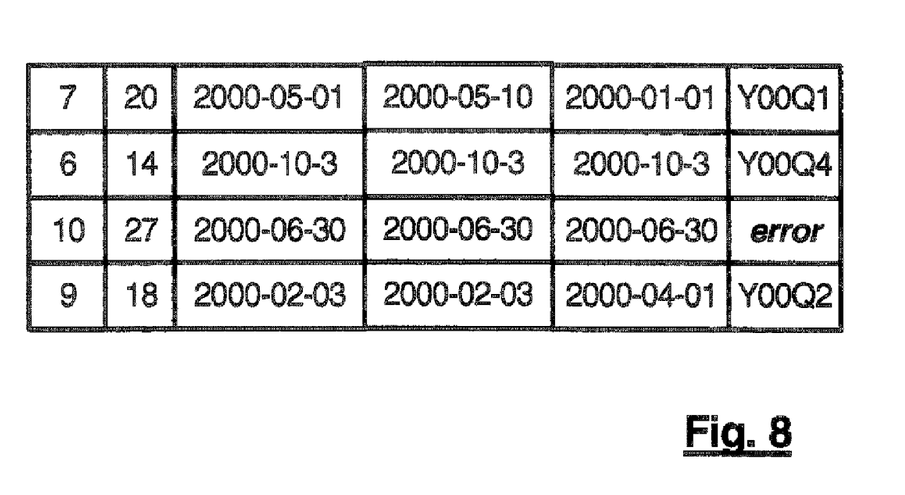
FIG. 8 shows the working table of FIG. 7 containing the qualified data after all of the base tables have been processed.

The next base table, in this example Y00Q4, is then processed, again in the same manner. Again, in this case no before triggers have been defined for table Y00Q4 so the working table is unchanged from that shown in FIG. 7 when the next step, evaluating the constraints for Y00Q4 is performed. As can be seen, row two is the only row of the working table that meets the constraints of table Y00Q4. The table ID field for row two is checked and, as the value of the table ID field for that row is NULL, then: an identifier for table Y00Q4 is inserted into the table ID field; the before trigger processed value of each identified field is copied to the respective second copy field (in this case this value is unchanged from the original value), in our example date_cp2; and the original value from each identified field is copied from the respective first copy field, in our example date_cp1, back to the respective identified field to obtain the working table illustrated in FIG. 8.

When all base tables have been processed, the method utilizes the working table to effect the appropriate INSERTs and to generate any necessary error messages. For each row with a table identifier in its table ID field, an entry is inserted into the identified table with the field data in the fields of the row, except for the identified fields. The values in the second copy (in this example, date_cp2) of the identified fields are used for the values of identified constraint fields, as these values have been processed by the before triggers which are not triggered again for these INSERT operations.

For any row in the working table with a NULL entry in the table ID field, a no target error is generated and, for any row with an error value in the table ID field, an ambiguous insert error message is generated.

Figure 9A:
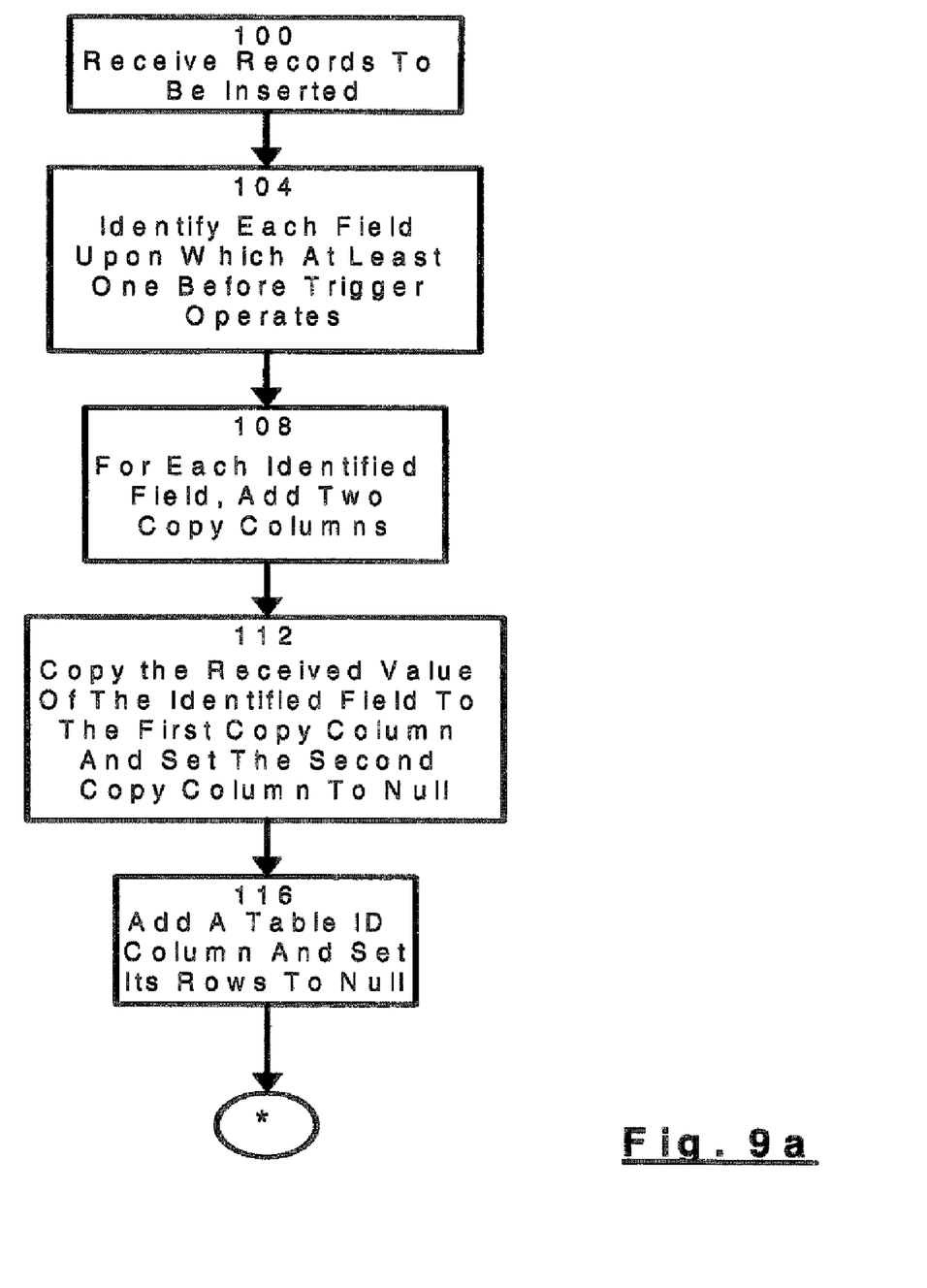
FIGS. 9a and 9b show a flowchart of a method in accordance with the present invention.
Figure 9B:
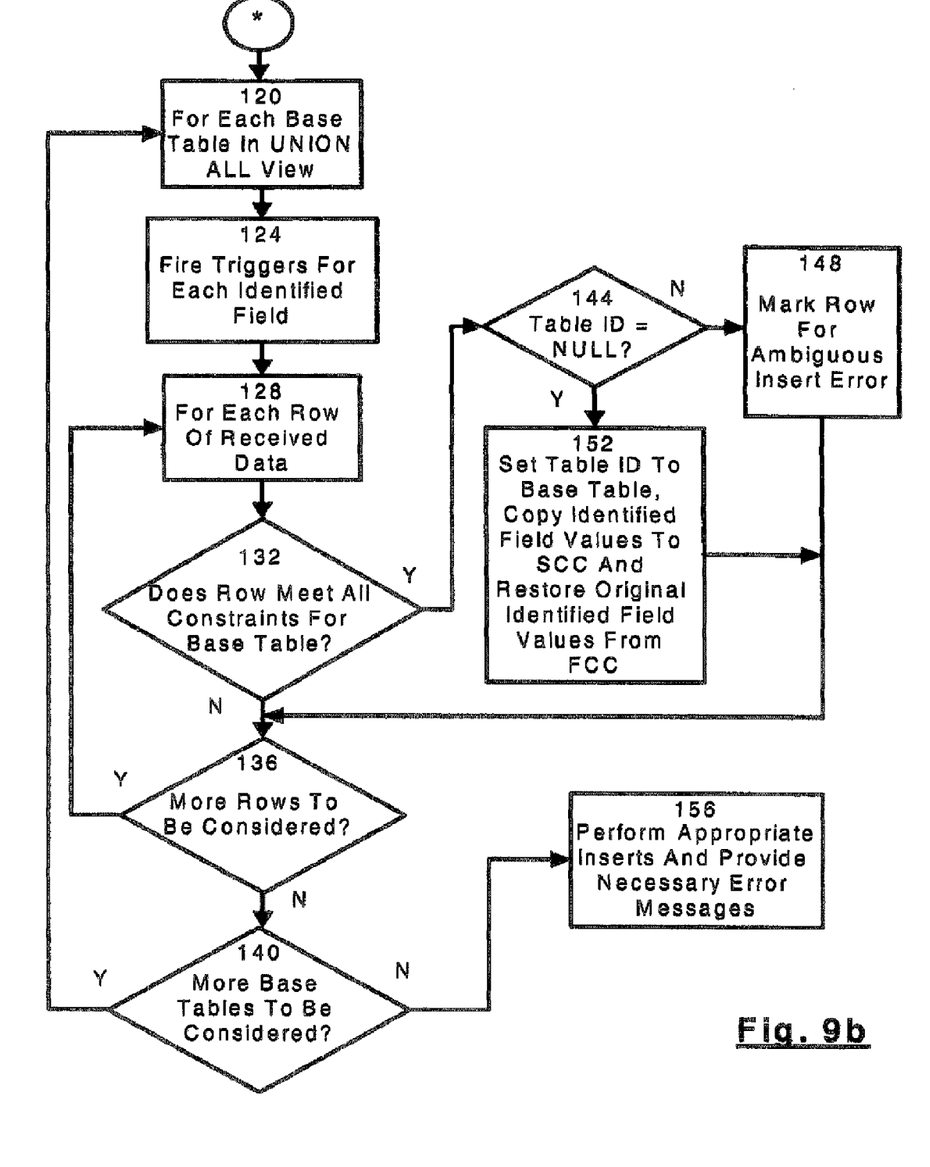

A flowchart of the method of the present invention is shown in FIGS. 9a and 9b. As shown, the process commences at step 100 wherein a set of records to be inserted through a UNION ALL view is received. At step 104, all of the fields for the base tables of the UNION ALL view, which can be modified by a before trigger defined for at least one of the base tables, are identified.

At step 108, two columns are added to the received records for each identified field, the added columns to hold copies of the values of the respective identified field.

At step 112, the original value of each identified field is copied to the first added column and the second added column is set to NULL.

At step 116, a table ID column is added to the received records and the table ID column rows are set to NULL. At this point, the working table described above has been constructed.

At step 120, the method begins to process, in turn, each base table of the UNION ALL view. At step 124, that processing includes the firing (i.e.—execution) of all triggers that operate on the identified fields and can result in modifications to the field data for those identified fields but, as described above, a copy of the original data from those identified fields is maintained in the first added column.

At step 128, the method starts, in turn, to consider each row of the received data and at step 132 a determination is made as to whether the row under consideration meets the all of the constraints for insertion into the base table. If the row does not meet one or more of the constraints for insertion into the base table, then further consideration of that row stops and a determination is made at step 136 as to whether additional rows remain to be considered. If one or more additional rows remain to be considered, the method selects the next row at step 128 and the process continues.

If at step 136 no more rows remain to be considered, a determination is made at step 140 as to whether any more base tables remain to be considered. If one or more base tables remain to be considered, at step 120 the method selects the next base table to be considered.

At step 132, if a row, after triggering of the before triggers, meets all of the constraints for insertion into the base table, then a determination is made at step 144 as to whether the table ID field for that row is a NULL. If the value of the table ID field is not NULL, then at step 148 that row is marked for having an ambiguous insert error and the method proceeds to step 136 to determine if any more rows remain to be considered.

If at step 144 the table ID field is NULL, then at step 152 the table ID filed is set to an identifier indicating the base table under consideration, the identified field values are copied to the second copy column (SCC) and the original values are restored to the identified fields by copying them from the first copy column (FCC). The method then proceeds to step 136 to determine if any more rows are to be considered.

At step 140, if no more base tables remain to be considered then the method concludes at step 156 where the now qualified data is ready for insertion. If the table ID field for a row contains a valid table identifier, then the row is ready for insertion into the identified base table, using the identified field values stored in the second copy column. If the table ID field contains a NULL, a no target error is returned. If the table ID contains an error flag, then an ambiguous insert error is returned.

In the first embodiment discussed above, once the received data has been qualified, it can be inserted without the need to re-fire the before triggers applicable to the appropriate base table as the data which has been modified by the before triggers during qualification of the received data has been stored in the second copied column. As will be apparent to those of skill in the art that this is merely a preferred implementation wherein the need to process the before triggers again has been eliminated by the inclusion of an extra column (the second copy column) in the working table for each identified field.

The present invention can be employed with only a first copied column (used to store the original value ) for each identified field. In this second embodiment, after the processing of the working table for the last base table has completed, the original value of each identified field is replaced, by copying the original value from each respective first copied column to each respective identified field. After the original values have been restored, the qualified data which can be inserted has the relevant before triggers fired for it after which it is inserted as before. In this embodiment, a tradeoff has been made between reducing the amount of storage space required for the copies of the identified fields (only one copy is required versus two) and the amount of computation which must be performed.

In yet another embodiment of the present invention which is a variant either or both of the first and second embodiments discussed above, only fields in the received data which are parameters in a constraint defined for at least one base table are identified, and these fields are referred to herein as identified constraint fields. In processing the received data in this embodiment, copies (two copies for this variant of the first embodiment discussed above and a single copy for this variant of the second embodiment discussed above) are only added to the working table for these identified constraint fields.

In this variant of the first embodiment, once qualification of the received data is complete, prior to insertion of the received data into the appropriate base tables, before triggers defined for the target base table into which the received data is to be inserted are fired for all fields except the identified constraint fields. The results from these before triggers and the results stored in the second copy column for the identified constraint fields are then inserted into the target base table along with any other fields. This variant saves the computation required to re-fire the identified constraint fields and saves storage space in the working table by only requiring copy columns to be added for identified constraint fields and not requiring copy columns to be added for all identified fields.

In this variant of the second embodiment, only one copy column is employed and once qualification of the received data is complete, prior to insertion of the received data into the appropriate base tables, all before triggers defined for the target base table into which the received data is to be inserted are fired. The results from these before triggers are then inserted into the target base table along with any other fields. This variant saves storage space in the working table by only requiring one copy columns to be added for identified constraint fields and not requiring copy columns to be added for all identified fields.

It is also contemplated that, in another embodiment, all fields in the rows of the received data will be copied, either one of the single or double copy embodiments described above, thus eliminating the computation required to determine which fields will be modified by a before trigger at the expense of requiring additional storage space for the copies in many cases.

The present invention is not limited to use with the DB2 database and can be used with any DBMS that provides functionality similar to a UNION ALL View formed from the union of two or more base tables. Further, the present invention is not limited to DBMSes which employ SQL as a control mechanism and the present invention can also be applied to DBMSes which employ any other suitable control method. In such cases, appropriate features in those control mechanisms which are equivalent to before triggers, constraints and the other specific SQL features referred to herein can be employed.

The above-described embodiments of the invention are intended to be examples of the present invention and alterations and modifications may be effected thereto, by those of skill in the art, without departing from the scope of the invention which is defined solely by the claims appended hereto.

We claim:

1. A method for inserting received data into a database through a view constructed from a union of two or more base tables, the method implemented in a database management system to be operatively coupled to a data processing system having memory for storing the database, each base table having one or more constraints defining necessary conditions for at least one field of the data to meet for data to be inserted into the respective base table and including at least one before trigger operable to modify the data in a field before the insertion is performed, the method comprising the steps of:

for each field of the received data, adding a first column to the received data to each hold a copy of the original value of the field and copying the original values to the first column;

adding a table identifier column to the received data to hold an identifier of a base table and setting the value of each row of the table identifier column to a predefined value;

for each base table in turn, executing all before triggers defined for the base table on the received data and determining for each row of the received data if the values of the received data after the before triggers have been processed meet the identified constraints to insert the row of received data into the base table and, for each row:

(a) if the identified constraints are met, determining if the table identifier column for that row has the predefined value and: (i) if it does not, marking the row with an error message indicating an ambiguous insert error and, (ii) if it does have the predefined value, then changing the value of the table identifier column to indicate the base table under consideration and copying the original value of each field from the first column to the respective field; or (b) if the identified constraints are not met, copying the original value of each field from the first column to the respective identified field ; and after all base tables have been considered, inserting each row of received data with an indication of a base table in the table identifier column into the indicated base table having first processed all before triggers defined for the indicated base table.

2. The method of claim 1 further comprising the step of first, for each base table, identifying fields which can be modified by a before trigger defined for the base table and adding the first column only for those identified fields and copying original values to and from the first added column only for those identified fields.

3. The method of claim 1 further comprising the step of returning an ambiguous insertion error for each row of received data marked with an error message.

4. The method of claim 1 further comprising the step of returning a no target error message for each row of received data having the table identifier column still indicating the predefined value.

5. The method of claim 1 wherein the database employs structured query language as a control mechanism.

6. The method of claim 5 wherein the view is constructed from a union all operation on the base tables.

7. A computer program product for directing a data processing system to insert received data into a database through a view constructed from a union of two or more base tables, the computer program product configured for a database management system to be operatively coupled to the data processing system having memory for storing the database, each base table having one or more constraints defining necessary conditions for at least one field of the data to meet for data to be inserted into the respective base table and including at least one before trigger operable to modify the data in a field before the insertion is performed, the computer program product comprising:

a computer readable medium for tangibly transporting computer executable code for directing the data processing system, the computer executable code comprising:

code for adding a first column to the received data to each hold a copy of the original value of the field and copying the original values to the first column for each field of the received data;

code for adding a table identifier column to the received data to hold an identifier of a base table and setting the value of each row of the table identifier column to a predefined value;

code for executing, for each base table in turn, all before triggers defined for the base table on the received data and determining for each row of the received data if the values of the received data after the before triggers have been processed meet the identified constraints to insert the row of received data into the base table and, for each row:

(a) if the identified constraints are met, determining if the table identifier column for that row has the predefined value and:

(i) if it does not, marking the row with an error message indicating an ambiguous insert error and, (ii) if it does have the predefined value, then changing the value of the table identifier column to indicate the base table under consideration and copying the original value of each field from the first column to the respective field; or (b) if the identified constraints are not met, copying the original value of each field from the first column to the respective identified field; and code for inserting each row of received data, after all base tables have been considered, with an indication of a base table in the table identifier column into the indicated base table having first processed all before triggers defined for the indicated base table.

8. The computer program product of claim 7 further comprising:

code for first identifying fields, for each base table, which can be modified by a before trigger defined for the base table and adding the first column only for those identified fields and copying original values to and from the first added column only for those identified fields.

9. The computer program product of claim 7 further comprising code for returning an ambiguous insertion error for each row of received data marked with an error message.

10. The computer program product of claim 7 further comprising code for returning a no target error message for each row of received data having the table identifier column still indicating the predefined value.

11. The computer program product of claim 7 wherein the database employs structured query language as a control mechanism.

12. The computer program product of claim 11 wherein the view is constructed from a union all operation on the base tables.

* * * * *